United States Patent [19]
Allread

[11] 4,438,779
[45] Mar. 27, 1984

[54] BALL VALVE COUPLING
[75] Inventor: Alan R. Allread, Jackson, Mich.
[73] Assignee: Aeroquip Corporation, Jackson, Mich.
[21] Appl. No.: 321,433
[22] Filed: Nov. 16, 1981
[51] Int. Cl.³ .............................................. F16L 37/06
[52] U.S. Cl. ............................ 137/614.06; 251/149.9; 285/85
[58] Field of Search ..................... 285/85, 401, 402; 137/614.06, 637.05; 251/149.9, 149.5

[56] References Cited
U.S. PATENT DOCUMENTS

| | | | |
|---|---|---|---|
| 974,501 | 11/1910 | Leonard | 251/149.9 |
| 1,038,669 | 9/1912 | Shepherd | 251/149.9 |
| 1,857,420 | 5/1932 | Wolford | 285/85 |
| 2,684,860 | 7/1954 | Rafferty | 285/85 |
| 2,948,553 | 8/1960 | Gill et al. | 137/614.02 |
| 3,159,180 | 12/1964 | Courtot et al. | 137/614.06 |
| 3,479,005 | 11/1969 | De Graaf | 285/85 |

FOREIGN PATENT DOCUMENTS

| | | | |
|---|---|---|---|
| 84757 | 4/1958 | Denmark | 251/149.9 |
| 63833 | 1/1892 | Fed. Rep. of Germany | 251/149.6 |

Primary Examiner—A. Michael Chambers
Attorney, Agent, or Firm—Beaman & Beaman

[57] ABSTRACT

The invention pertains to fluid couplings of high capacity, low resistance flow characteristics utilizing ball valves. Identical fitting bodies each include a ball valve rotatable 90° between open and closed positions by an exteriorly accessible handle. Locking means of one coupling half associated with the ball valve actuator through cam structure cooperates with locking means defined upon the other coupling half wherein rotation of the ball valves to the open position is prevented until the coupling halves have been fully connected. Further, the locking means prevent the coupling halves from being disconnected until both ball valves have been closed.

5 Claims, 4 Drawing Figures

BALL VALVE COUPLING

BACKGROUND OF THE INVENTION

Fluid couplings, such as the type commonly used on the ends of flexible hose to selectively connect and disconnect the hose to complete a fluid flow circuit often utilize valves within the couplings to close the coupling to fluid flow prior to disconnection.

Valved fluid couplings may be of the "self-sealing" type wherein valve structure of the coupling fitting automatically closes and opens upon the coupling being disconnected, and coupled, respectively. The most common type of self-sealing valve structure includes axially movable valve components, such as a sleeve or poppet valve wherein relative axial movement between the coupling halves during coupling and uncoupling is utilized to displace the valve structure. As sleeve and poppet type valves usually include ports and flow passages requiring the fluid flow to be transverse, usually perpendicular, to the axis of the coupling passage, such valves produce significant pressure loss within the fluid passing through the coupling, and also produces turbulence and other undesirable characteristics.

Couplings utilizing ball valves have not been widely used in view of several manufacturing and operating deficiencies. While ball valves utilizing a fluid flow bore of a diameter substantially equal to the coupling passage create little flow resistance, prior coupling constructions are unduly large. Further, while a ball valve only need rotate 90° between its full open and full closed positions its operating characteristics do not readily lend themselves to automatic self-sealing operation. Manual control of the ball valves must be coordinated with the state of the interconnection between the coupling halves, and prior art couplings have not successfully combined the high flow capacity, low flow resistance advantages of ball valves with concise coupling construction and safety features which minimize leakage during uncoupling and coupling, and operation.

It is an object of the invention to provide a coupling utilizing a ball valve wherein the high capacity, low flow resistance characteristics of ball valves are utilized to the maximum, and yet, spillage and leakage of the fluid being carried is minimized.

Another object of the invention is to provide a fluid coupling utilizing a ball valve wherein opening of the valve is prevented until a full coupling connection has been made, and uncoupling cannot occur until the ball valve has been shifted to its closed position.

A further object of the invention is to provide a coupling having identical halves wherein each half is provided with a ball valve, and the ball valve of each half cannot be opened until the halves are fully coupled, and the coupled halves cannot be discoupled until both ball valves have been fully closed.

Another object of the invention is to provide a fluid coupling utilizing ball valves wherein fluid leakage during uncoupling is minimized.

In the practice of the invention coupling halves are employed each having a passage, at least one of which receives a rotatable ball valve having a diametrical bore substantially equal to the coupling passage. The ball valve is rotatable 90° between fully open and fully closed positions, and valve positioning is through an actuator which includes an exteriorly accessible manually operated handle. While only one coupling half may be valved, the most common embodiment uses identical coupling halves each valved, and such a coupling is hereinafter described.

The coupling halves are interconnected by axially extending headed projections received within complementary shaped lipped recesses, both of arcuate form and concentrically related to the axes of the coupling halves. Reception of the projections into the recesses, and relative rotation of the coupling halves about their longitudinal axes, interlocks the coupling halves with bayonet type connections and a predetermined relative rotation between the coupling halves must be achieved to produce a fully coupled relationship.

Each coupling half is provided with locking means in the form of an axially displaceable detent pin operated by a cam surface defined on the associated valve actuator. Rotation of the valve from the closed to the open position causes the detent pin to axially extend from a sealing surface defined on the coupling end which is received within a recess defined within the opposed coupling half only if the coupling halves are fully interconnected. Thus, the locking pin detent of one coupling half must be aligned with a locking recess within the other coupling half in order to permit rotation of the ball valves from the closed to the open positions, thereby preventing inadvertent leakage in the event the valves could be opened prior to being fully coupled.

Conversely, the locking means prevents the coupling halves from being disconnected from each other until the ball valves have been rotated to the fully closed positions.

The sealing surface defined at the coupling end of the halves is substantially tangential to the spherical exterior surface of the associated ball valve wherein the volume of the void within the coupling passage between the ball valve and the sealing surface is minimized, reducing the volume of fluid which may escape during uncoupling of the halves.

As the bore of the ball valves is of a diameter substantially equal to the passage diameter through the coupling halves only negligible resistance is created in the coupling halves by the valve structure, and valves manufactured in accord with the inventive concept permit maximum fluid flow with minimum pressure loss characteristics for a given coupling size.

BRIEF DESCRIPTION OF THE DRAWINGS

The aforementioned objects and adanvatages will be appreciated from the following description and accompany drawings wherein.

DESCRIPTION OF THE PREFERRED EMBODIMENT

Figure 1:
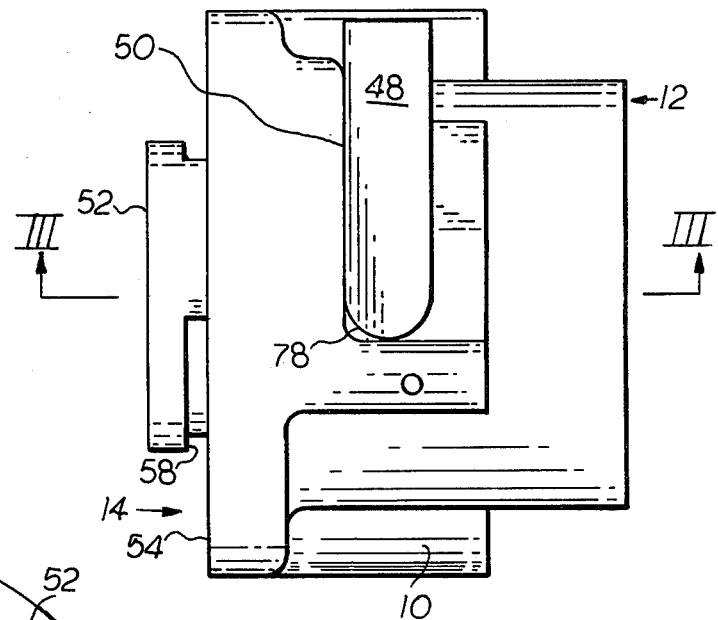
FIG. 1 is a top plan view of the coupling half in accord with the invention.

A coupling fitting in accord with the invention includes an annular body 10 having a conduit connection end 12, and a coupling end 14. The body 10 includes a passage 16 which intersects the ends, and an annular valve seat is defined within the passage concentric thereto by spherical surface 18, and a seal ring 20.

A ball valve 22 is rotatably mounted within the passage 16 and includes a spherical exterior surface 24 and a diametrical bore 26 which extends therethrough. As will be appreciated from FIG. 3 the valve seat spherical surface 18 and seal 20 engages the ball valve surface.

An annular adapter extension 28, which may be mounted upon a hose, or other conduit component of the fluid circuit, not shown, extends into the passage 16 and is sealed with respect thereto by O-ring 30. The adapter 28 is maintained within body 10 by a drive wire 32 received within aligned grooves wherein rotation of the body relative to the adapter is possible. An annular bearing 34 is slidably mounted within extension 28 and includes a spherical surface which engages the ball valve surface 24 and a wave washer 36 interposed between radial surfaces defined upon the extension 28 and bearing 34 biases the bearing and ball valve toward the left, FIG. 3, to assure a firm sealing engagement between the exterior surface of the ball valve and the valve seat seal 20.

Figure 3:
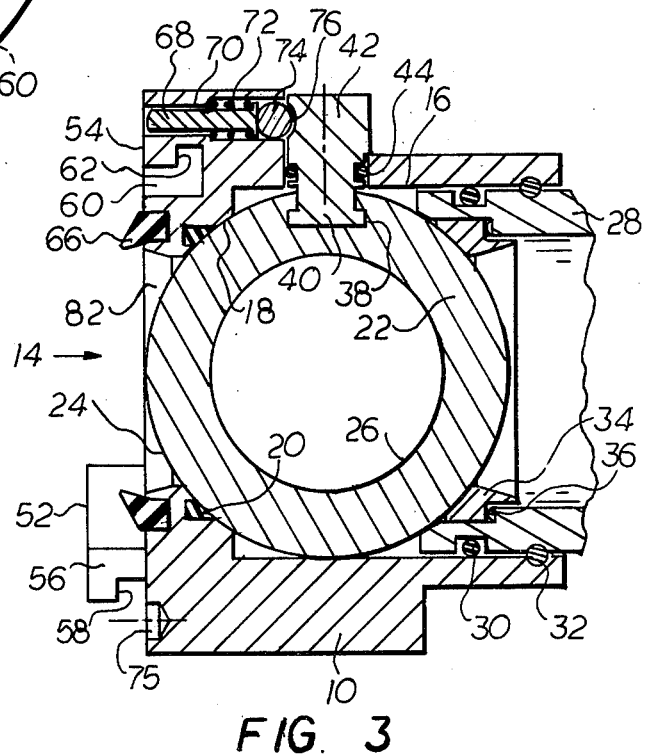
FIG. 3 is an elevational diametrical sectional view of a coupling half as taken along Section III—III of FIG. 1, the ball valve being in the closed position.

A T-slot 38, FIG. 3, is defined in the ball valve 22 and receives the T-shaped head 40 of the ball valve actuator 42. The actuator 42 extends through a bore 44 defined in the wall of the body 10 and is sealed with respect thereto by seal 46. The actuator includes a handle portion 48 disposed adjacent the exterior surface of the body 10 as to be exteriorly accessible, and rotation of the handle 48 from the position shown in FIG. 3 where the handle is against body stop surface 50 90° clockwise to the position shown in FIG. 4 will rotate the ball valve 22 from the closed condition of FIG. 3 wherein the bore 26 is disposed at 90° to the axis of the fitting passage 16, to the open position of FIG. 4 when the bore 26 is coaxially aligned with the axis of the fitting body to permit unrestricted fluid flow through the body.

The connection structure utilized with the coupling of the invention includes a pair of arcuate projections 52 extending from the body flat sealing surface 54 defined at the coupling and 14 of the body perpendicular to the axis of body 10. The projections 52 include a head or knob 56, defining a radial surface 58, for cooperation with a complementary groove, as described below.

Figure 2:
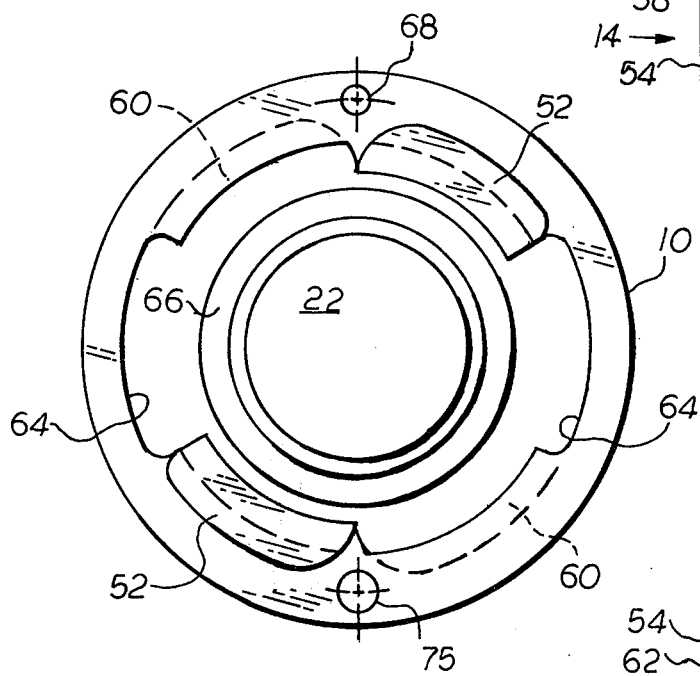
FIG. 2 is an end elevational view of the coupling half of FIG. 1 as taken from the left end thereof.

The body 10 is also provided with a pair of annular lipped grooves 60 of arcuate form defined in surface 54 which include a lip defining radial surface 62, FIG. 3, and the grooves 60 each include an enlarged access opening 64, FIG. 2. The projections 52, and the grooves 60, are concentrically related to the axis of the associated fitting body, and as will be appreciated from FIG. 2, the enlarged access openings 64 defined within the body end 14 are capable of receiving the enlarged heads 56 of the projections of a coupling body to be connected to the body 10.

An annular elastomeric lip seal 66 is mounted within the body at the coupling end, and intersects the sealing surface 54, as will be appreciated from FIG. 3.

A detent pin 68 is slidably mounted within a bore 70 defined in body 10 for movement in a direction parallel to the longitudinal axis of the body. The detent pin 68 provided with an enlarged head against which compression spring 72 bears to bias the detent pin away from the sealing surface 54 intersected by bore 70. A ball 74 engages the headed end of pin 68, and the spring will continually bias the pin and ball toward the ball valve actuator 42. Also, a recess 75 is defined in surface 54 diametrically opposite to pin 68 and the same radial distance from the axis of body 10. The recess 75 is of a diameter slightly larger than that of pin 68.

The actuator 42 is provided with a recess 76 which aligns with the ball 74 upon the ball valve 22 being rotated to the closed position shown in FIGS. 1 and 3. This alignment permits the ball 74 to be received within the recess 76 permitting the detent pin 68 to be fully retracted to the position of FIG. 3 "behind" the sealing surface 54. The recess 76, and adjacent cylindrical surface 78 of the actuator 42, constitutes a cam which controls the position of the detent pin.

Figure 4:
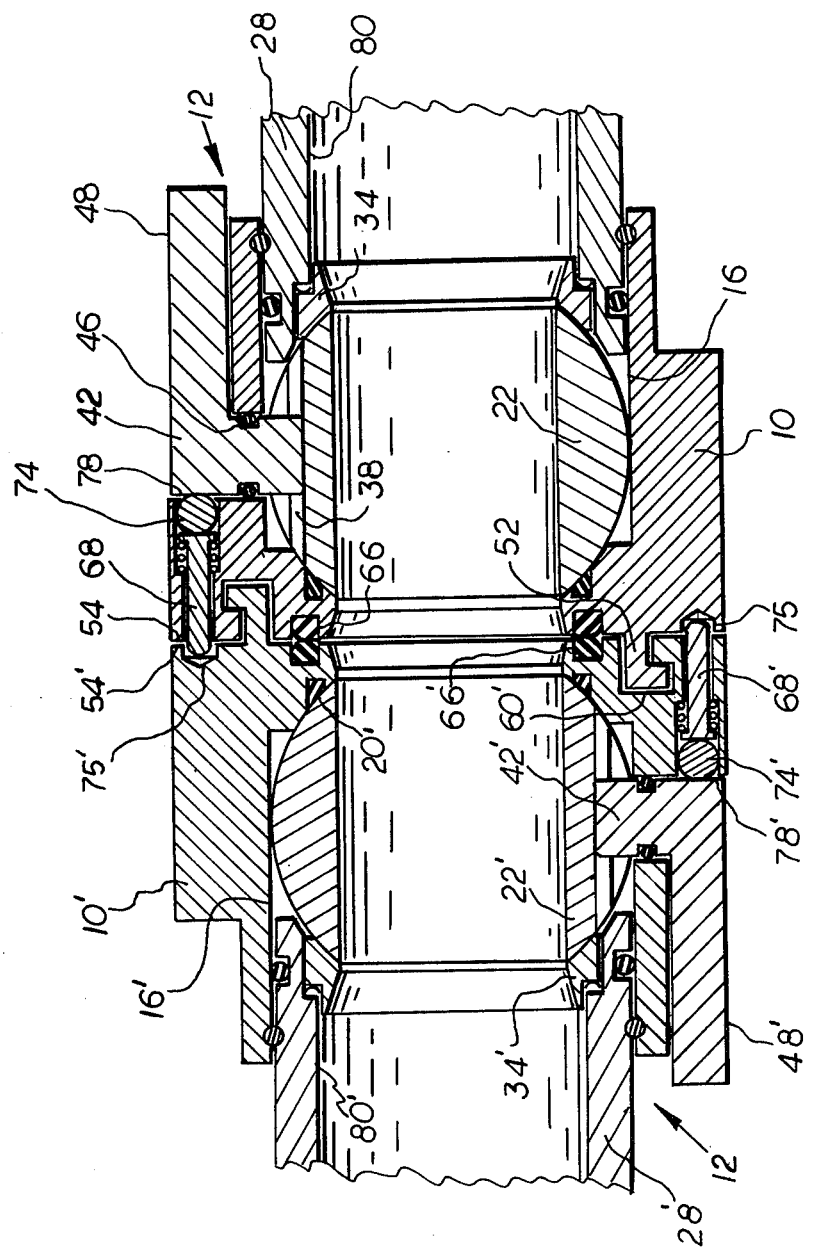
FIG. 4 is an elevational, diametrical sectional view taken through a coupling in accord with the invention wherein identical coupling halves are interconnected and the ball valves have been rotated to the fully open position.

In utilizing the fitting of FIGS. 1-3 it is not necessary that the interconnected coupling parts both be valved, it is only necessary that both coupling parts include projections 52 and grooves 60. However, in most cases both coupling halves will be valved and FIG. 4 illustrates a typical complete coupling utilizing the described coupling parts. The coupling halves are identical in all respects, and for this reason identical reference numerals are employed on both halves, and primes are used to designate the components of the left coupling half. In FIG. 4 the adapter 28 is shown to a slightly greater extent than in FIGS. 1-3, and the adapter includes a bore 80 and may constitute metal components mounted upon the ends of flexible hose, or one adapter may be associated with flexible hose, while the other adapter is connected to a tank or other "fixed" conduit fitting.

To connect the coupling bodies 10 and 10' the axes of the passages of the bodies are aligned, and are rotated relative to each other such that the headed projections 52 align with the access openings 64' of body 10', and the projections 52' of body 10' align with the access openings 64 of body 10. Upon this alignment being achieved the bodies 10 and 10' are axially moved toward each other and rotated relative to each other causing the projection surfaces 58 and 58' to engage the groove surfaces 62 and 62' and rotation of the coupling halves continues until the projection heads engage the "ends" of the grooves 60 and 60'. The radial surfaces 58 and 62 may be inclined in a slight helical configuration to "draw" the body sealing surfaces 54 toward each other during this relative rotation connecting the coupling halves. As appreciated from FIG. 4, the seals 66 and 66' will engage, and be deformed during coupling, producing a fluid tight seal between the coupling halves.

Upon the relative rotation between the bodies 10 and 10' being fully completed the detent pins 68 and 68' will be in axial alignment with the recesses 75 and 75' and this alignment only occurs upon the coupling halves being fully coupled. Thereupon, the handles 48 and 48' may be rotated 90° to open the ball valves 22 and 22', and open the coupling to fluid flow therethrough.

Opening of the ball valves is permitted due to the alignment of the recesses 75 and 75' with the detent pins 68 and 68' since rotation of the handles will cause the balls 74 and 74' to ride out of the actuator recesses 76 and 76' and cause the outer ends of the detents to axially project beyond their associated sealing surface 54, and into the opposed recess in the other body. Such displacement of the detent pin permits the balls to rotatably or slidably engage the aligned cylindrical surface 78 of the actuator, and manual rotation of the ball valves is readily produced.

Should the coupling bodies 10 and 10' not be fully connected when it is attempted to open the ball valves, rotation of the handles 48 and 48', valve actuators and associated ball valves is prevented due to the fact that the detent pins 68 and 68' will engage the opposed body seal surface 54 and 54' and not permit the detent balls 74 and 74' to "ride" out of the actuator cam recesses 76 and 76'. Alignment of the recesses 76 and 76' with the detent pins 68 and 68' only occurs upon sufficient relative rotation between the coupling bodies to produce full coupling, and any rotation less than that necessary to fully couple the halves will prevent the ball valves from being manually opened.

It will also be appreciated that when even one of the ball valves 22 is open, while the bodies 10 and 10' are fully coupled, that it is not possible to uncouple the bodies. The presence of one detent pin 68 within a recess 75 will prevent relative rotation between the coupling bodies, and hence, both of the ball valves 22 must be rotated to the fully closed position permitting the detent pins to fully retract before the coupling bodies can be disconnected from each other by relative rotation. Disconnection occurs when relative rotation between the coupling bodies aligns the projections 52 with the access opening 64 and the bodies may be separated.

As will be appreciated from FIG. 3, the ball valve 22 is located within the body 10 such that the plane of the sealing surface 54 is substantially tangential to the spherical ball valve surface 24. This relationship minimizes the volume of the annular passage void 82 between the ball valve surface and the sealing surface 54, thereby minimizing the amount of fluid which will be lost upon the ball valves being closed and the coupling bodies being disconnected.

As the diameter of the ball valve bore 26 is substantially equal to the diameter of the flow passage 16 through the coupling, and adapters, the ball valves produce little resistance to liquid flow, and do not create significant turbulence. The disclosed construction can be utilized with couplings of relatively small diameter, yet having excellent fluid flow characteristics, and the components can be fabricated with conventional techniques.

It is appreciated that various modifications to the inventive concepts may be apparent to those skilled in the art, for instance, the form of the means for interconnecting the coupling bodies may take various configurations, without departing from the spirit and scope of the invention.

I claim:

1. A coupling comprising, in combination, a first annular body having a passage defined therein having a longitudinal axis, said body having a conduit connection end for communicating with conduit means and a coupling end, said passage communicating with said conduit connection and coupling ends, a ball valve rotatably mounted within said passage, said ball valve including a spherical exterior surface and a diametrical bore extending through said valve, a valve actuator attached to said ball valve extending through said body having a manually operated handle exteriorly accessible of said body for selectively rotating said ball valve between an open position wherein said bore is in alignment with said passage axis and a closed position wherein said bore is tranversely disposed to said passage axis, an annular value seat within said passage concentric to said passage axis sealingly engaging said ball valve exterior surface, first coupling attachment means defined upon said first body coupling end, a second annular body having a passage defined therein having a longitudinal axis, said second body having a conduit connection end for communicating with conduit means and a coupling end, said second body passage communicating with said second body conduit connection and coupling ends, second coupling attachment means defined upon said second body coupling end complementary in configuration to said first coupling attachment means and connectable thereto to a fully coupled condition to align said passages of said first and second bodies, first locking means defined upon said first body operatively connected to said valve actuator for selective movement between first and second positions upon rotation of said ball valve between said open and closed positions, respectively, and second locking means defined on said second body alignable with and receiving said first locking means upon said first and second coupling attachment means being in the fully coupled condition permitting said first locking means to be shifted from said second position to said first position to permit said ball valve to be rotated from said closed position to said open position only upon said first and second bodies being fully coupled, said first body coupling end including a flat sealing surface perpendicularly disposed to the axis of said first body passage, said spherical valve exterior surface being substantially tangential to said sealing surface when said ball valve is in said closed position to minimize the volume of voids within said first body passage adjacent said sealing surface.

2. A coupling comprising, in combination, a first annular body having a passage defined therein having a longitudinal axis, said body having a conduit connection end for communicating with conduit means and a coupling end, said passage communicating with said conduit connection and coupling ends, a ball valve rotatably mounted within said passage, said ball valve including a spherical exterior surface and a diametrical bore extending through said valve, a valve actuator attached to said ball valve extending through said body having a manually operated handle exteriorly accessible of said body for selectively rotating said ball valve between an open position wherein said bore is in alignment with said passage axis and a closed position wherein said bore is transversely disposed to said passage axis, an annular valve seat within said passage concentric to said passage axis sealingly engaging said ball valve exterior surface, first coupling attachment means defined upon said first body coupling end, a second annular body having a passage defined therein having a longitudinal axis, said second body having a conduit connection end for communicating with conduit means and a coupling end, said second body passage communicating with said second body conduit connection and coupling ends, second coupling attachment means defined upon said second body coupling end complementary in configuration to said first coupling attachment means and connectable thereto to a fully coupled condition to align said passages of said first and second bodies, first locking means defined upon said first body operatively connected to said valve actuator for selective movement between first and second positions upon rotation of said ball valve between said open and closed positions, respectively, and second locking means defined on said second body alignable with and receiving said first locking means upon said first and second coupling attachment means being in the fully coupled condition permitting said first locking means to be shifted from said second position to said first position to permit said ball valve to be rotated from said closed position to said open position only upon said first and second bodies being coupled, said first and second coupling attachment means each comprising interlocking elements which engage and disengage upon relative rotation about the axes of said first and second passages, said first and second locking means being radially spaced from the axes of said passages and selectively preventing relative rotation of said first and second bodies when fully coupled, said first locking means comprising a detent pin slidably supported upon said first body movable in the axial direction of said first body passage for axial extension from said first body coupling end at said first position of said first locking means, and said second locking means comprising a recess defined in said second body coupling end receiving said detent pin.

3. In a coupling as in claim 2, a cam surface defined upon said valve actuator, said detent pin being operatively associated with said cam surface whereby operation of said valve actuator by said handle selectively positions said detent pin at its first and second positions.

4. A coupling comprising, in combination, a first annular body having a passage defined therein having a longitudinal axis, said body having a conduit connection end for communicating with conduit means and a coupling end, said passage communicating with said conduit connection and coupling ends, a ball valve rotatably mounted within said passage, said ball valve including a spherical exterior surface and a diametrical bore extending through said valve, a valve actuator attached to said ball valve extending through said body having a manually operated handle exteriorly accessible of said body for selectively rotating said ball valve between an open position wherein said bore is in alignment with said passage axis and a closed position wherein said bore is transversely disposed to said passage axis, an annular valve seat within said passage concentric to said passage axis sealingly engaging said ball valve exterior surface, first coupling attachment means defined upon said first body coupling end, a second annular body having a passage defined therein having a longitudinal axis, said second body having a conduit connection end for commmunicatng with conduit means and a coupling end, said second body passage communicating with said second body conduit connection and coupling ends, second coupling attachment means defined upon said seoond body coupling end complementary in configuration to said first coupling attachment means and oonnectable thereto to a fully coupled condition to align said passages of said first and second bodies, first locking means defined upon said first body operatively connected to said valve actuator for selective movement between first and second positions upon rotation of said ball valve between said open and closed positions, respectively and second locking means defined on said second body alignable with and receiving said first locking means upon said first and second coupling attachment means being in the fully coupled condition permitting said first locking means to be shifted from said second position to said first position to permit said ball valve to be rotated from said closed position to said open position only upon said first and second bodies being fully coupled, a second ball valve rotatably mounted within said passage of said second body including a spherical exterior surface and a diametrical bore extending therethrough, a valve actuator attached to said second ball valve extending through said second body having a manually operated handle exteriorly accessible of said second body for selectively rotating said second ball valve between open and closed positions relative to said second body passage, an annular valve seat within said second body passage sealingly engaging said second ball valve exterior surface, third locking means defined on said second body operatively connected to said second ball valve actuator for selective movement between first and second positions upon rotation of said second ball valve between said open and closed positions, respectively, and fourth locking means defined upon said first body alignable with and receiving said third locking means upon said first and second coupling attachment means being in the fully coupled condition permitting said third locking means to be shifted from its second position to its first position to permit said second ball valve to be rotated from its closed position to its open position only upon said first and second bodies being fully coupled.

5. In a coupling as in claim 4, said first and second bodies and equivalent components being identical in all respects said third locking means being identical to said first locking means and said fourth locking means being identical to said second locking means, wherein said first and second ball valves must both be in said open position to permit flow through the coupling.

* * * * *